(12) United States Patent
Takasu (10) Patent No.: US 11,907,927 B2
(45) Date of Patent: Feb. 20, 2024

(54) SALES DATA PROCESSING SYSTEM AND METHOD WITH CODE SYMBOL READING AND SERVICE IMAGE RECOGNITION

(71) Applicant: TOSHIBA TEC KABUSHIKI KAISHA, Tokyo (JP)

(72) Inventor: Takuya Takasu, Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/727,374

(22) Filed: Apr. 22, 2022

(65) Prior Publication Data

US 2023/0032834 A1 Feb. 2, 2023

(30) Foreign Application Priority Data

Jul. 27, 2021 (JP) ................................. 2021-122323

(51) Int. Cl.
  *G06Q 20/20* (2012.01)
  *G06V 10/22* (2022.01)
  *G06T 1/00* (2006.01)
  *G06K 7/14* (2006.01)

(52) U.S. Cl.
  CPC ......... *G06Q 20/208* (2013.01); *G06K 7/1434* (2013.01); *G06T 1/0028* (2013.01); *G06V 10/225* (2022.01)

(58) Field of Classification Search
  CPC .. G06Q 20/208; G07G 1/0045; G06V 10/225; G06K 7/1447
  USPC ...................................... 235/383; 705/16, 23
  See application file for complete search history.

(56) References Cited

U.S. PATENT DOCUMENTS

2019/0318144 A1 10/2019 Iizaka

*Primary Examiner* — Suezu Ellis
(74) *Attorney, Agent, or Firm* — FOLEY & LARDNER LLP (57) ABSTRACT

A sales data processing system includes a first reader that reads a code symbol as a visible image included in image information output by an imaging unit, a second reader that reads a code symbol as an invisible image in the image information, and a third reader that recognizes a service image in the image information. The system includes a registrar that registers information as sales data on a commodity identified by the code symbol read by the first or second reader, and a standby processor that suspends reading by the second reader and waits for recognition of a service image by the third reader in response to a commodity being identified by the code symbol read by the second reader. The system includes a service processor that reflects a service in the sales data registered by the registrar in response to the third reader recognizing the service image.

15 Claims, 7 Drawing Sheets

FIG. 8

SALES DATA PROCESSING SYSTEM AND METHOD WITH CODE SYMBOL READING AND SERVICE IMAGE RECOGNITION

CROSS-REFERENCE TO RELATED APPLICATION

This application is based upon and claims the benefit of priority from Japanese Patent Application No. 2021-122323, filed on Jul. 27, 2021, the entire contents of which are incorporated herein by reference.

FIELD

Embodiments described herein relate generally to a sales data processing system and a method.

BACKGROUND

In recent years, digital watermarking technology has become widespread. Further, in recent years, in order to speed up the processing speed of commodity registration without having to select the surface facing a reading device, a digitally watermarked code symbol has been printed anywhere on a commodity package. Code symbols printed with digital watermarks are difficult for human eyes to recognize, but can be read by a dedicated code reader.

Commodities with such a digitally watermarked code symbol are mixed with commodities with a code symbol, which is a visible image, in current retail stores. Therefore, in addition to the code symbol reading itself, other accompanying processes require corresponding processes.

For example, a sticker indicating that a service is eligible for a value discount or the like is recognized together with a code symbol if the sticker is attached near the code symbol of a visible image.

DETAILED DESCRIPTION

In typical devices, since a digitally watermarked code symbol is anywhere on a package and difficult for human eyes to recognize, even if a sticker is attached, the sticker is not recognized together with the code symbol depending on the position read by a reading device. In the above description, a digitally watermarked code symbol has been described as an example, but there is a similar problem even if a code symbol that is an invisible image other than a digital watermark is used.

One of the objectives of the present disclosure is to reflect a service by recognizing an image indicating that a commodity is a target of the service, for example, in a sales data processing system that identifies the commodity with a code symbol printed as an invisible image such as a digital watermark. The sales data processing system may include one processor or multiple processors.

In general, according to one embodiment, a sales data processing system includes an imaging unit that generates and outputs image information by imaging, a first reading unit that reads a code symbol which is a visible image, included in the image information, a second reading unit that reads a code symbol which is an invisible image, included in the image information, a third reading unit that recognizes a service indicated by a service image by recognizing the service image included in the image information, a registration processing unit or registrar that registers information on a commodity identified by the code symbol read by the first reading unit or the second reading unit as sales data, a standby processing unit or standby processor that suspends reading by the second reading unit and waits for recognition of a service image by the third reading unit if a commodity is identified by the code symbol read by the second reading unit, and a service processing unit or service processor that reflects a service indicated by the service image in the sales data registered by the registration processing unit or registrar if the third reading unit recognizes the service image.

An embodiment will be described with reference to drawings. In the following embodiment, an example of application to a point of sale (POS) system installed in a retail store will be described, but the present disclosure is not limited to this embodiment.

Figure 1:
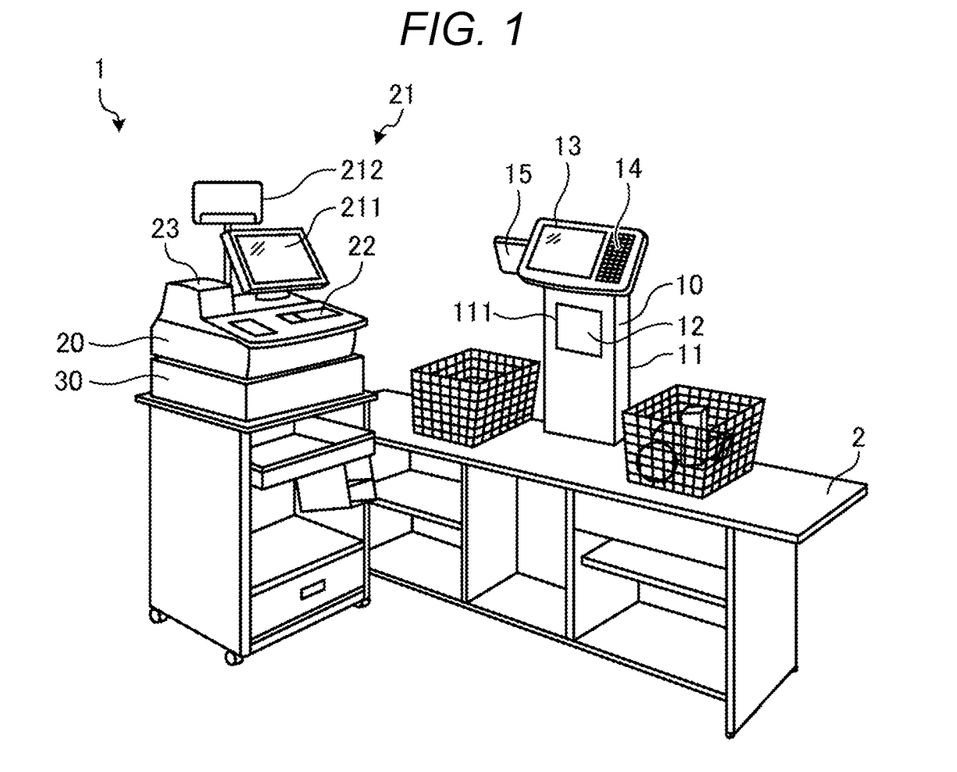
FIG. 1 is a view illustrating an overall configuration of a sales data processing system according to an embodiment.

FIG. 1 is a view illustrating an overall configuration of a sales data processing system 1 according to an embodiment. As illustrated in FIG. 1, the sales data processing system 1 includes a reading device or reader 10 and a POS terminal 20 that executes data processing based on the data read by the reading device or reader 10.

The reading device 10 is installed at a place (substantially central portion) where an operator and a customer substantially face each other on a sacker table 2 on which a shopping basket or the like containing commodities is placed. The POS terminal 20 is provided near one end of the sacker table 2. The reading device 10 and the POS terminal 20 are communicably connected by a transmission line (not illustrated). The reading device 10 and the POS terminal 20 constitute the sales data processing system 1.

The POS terminal 20 executes sales data processing including registration processing, settlement processing, and the like of commodities purchased by a customer, based on the data of the commodities and the like read by the reading device 10. The POS terminal 20 is installed, for example, on a drawer 30 that stores coins and banknotes so as to be freely put in and out.

The POS terminal 20 includes two display units or displays 21 (first display unit or display 211 and second display unit or display 212), a keyboard 22, and a receipt printer 23. The display unit 21 and the keyboard 22 are examples of an interface unit or interface that displays information to the operator and receives operations.

The display unit 21 is a display device with a touch panel composed of a display device such as a liquid crystal display (LCD). The first display unit 211 is mainly provided for the operator, and the second display unit 212 is mainly provided for customers.

The keyboard 22 is an input device including various keyboards and keys such as numeric keys and subtotal keys. The subtotal key is a key for asking the POS terminal 20 to finish reading a code symbol by the reading device 10 and proceed with the processing of settlement and payment. If this subtotal key is operated, the POS terminal 20 ends reading a code symbol, and proceeds with the processing of settlement and payment.

The receipt printer 23 is, for example, a thermal printer, and prints a receipt or the like according to the sales data processing executed by the POS terminal 20.

Figure 2:
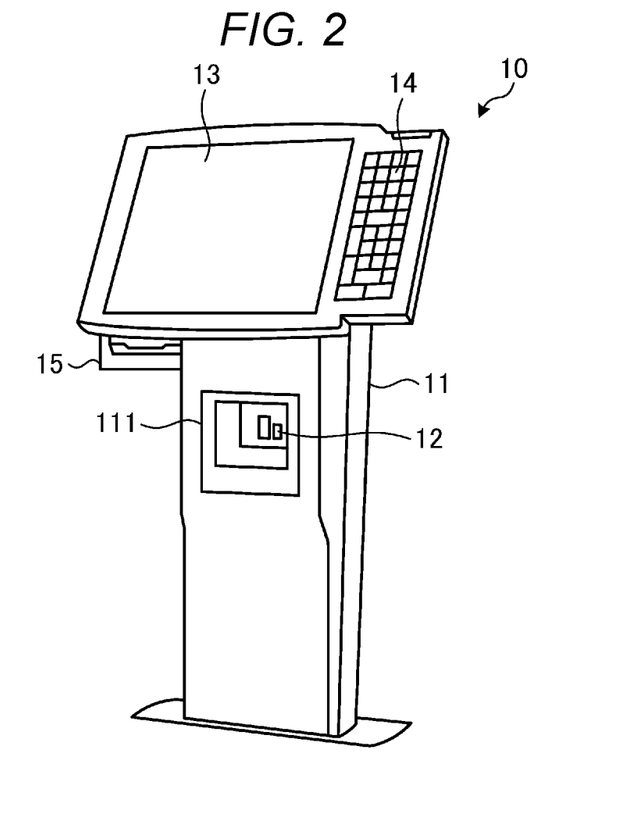
FIG. 2 is a perspective view illustrating an example of the appearance of a reading device.

Next, the configuration of the reading device 10 will be described. FIG. 2 is a perspective view illustrating an example of the appearance of the reading device 10. Here, FIG. 2 illustrates a state in which the reading device 10 is viewed from the side where an imaging window 111 is provided (the operator's standing position side).

The reading device 10 includes a main body 11, an imaging unit 12, a first display unit or display 13, a keyboard 14, a second display unit or display 15, and the like.

The main body 11 is formed in a substantially rectangular parallelepiped shape and is erected on the sacker table 2. The height of the main body 11 is preferably, for example, about the height of the operator's eyes or equal to or less than the height of the eyes from the sacker table 2.

The imaging window 111, which is an opening, is provided on the standing position side of the operator in the main body 11. The imaging unit 12 is installed in the imaging window 111. The operator reads (images) a commodity by holding the commodity brought by a shopper over the imaging window 111.

The imaging unit 12 includes imaging circuitry, in particular an imaging sensor such as a charge coupled device (CCD) or complementary MOS (CMOS), and an optical system such as an imaging lens. The imaging lens forms an image of an imaging region imaged by the imaging sensor on the imaging sensor. The imaging region refers to a region where an image is formed in the area of the imaging sensor through the imaging lens from the imaging window 111. The imaging unit 12 images the outside of the main body 11 via the imaging window 111. Specifically, the imaging unit 12 images the commodity to be purchased brought in by a shopper and outputs the image information generated by the imaging.

Figure 3:
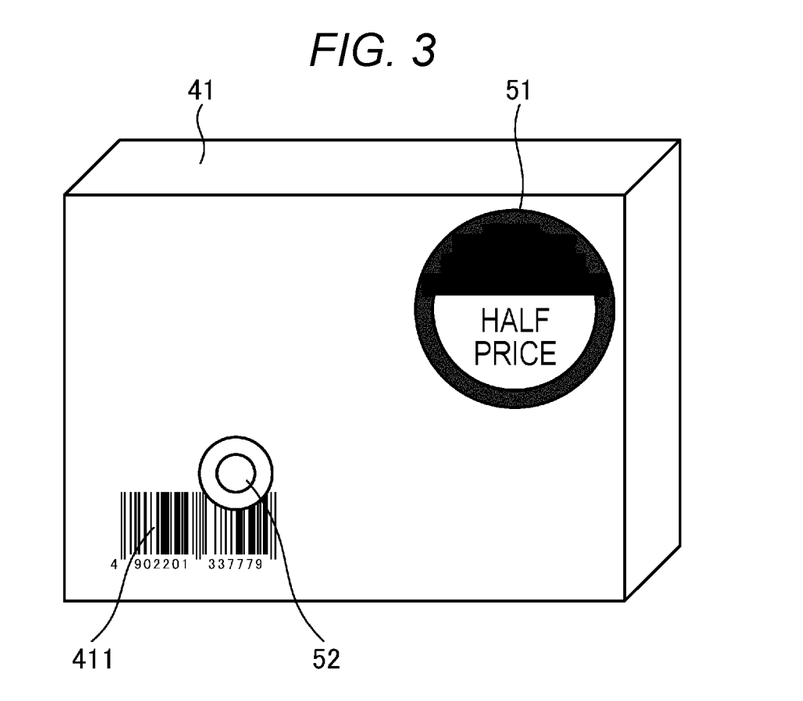
FIG. 3 is a perspective view illustrating an example of the appearance of a commodity on which a code symbol, which is a visible image, is printed and a service label is attached.
Figure 4:
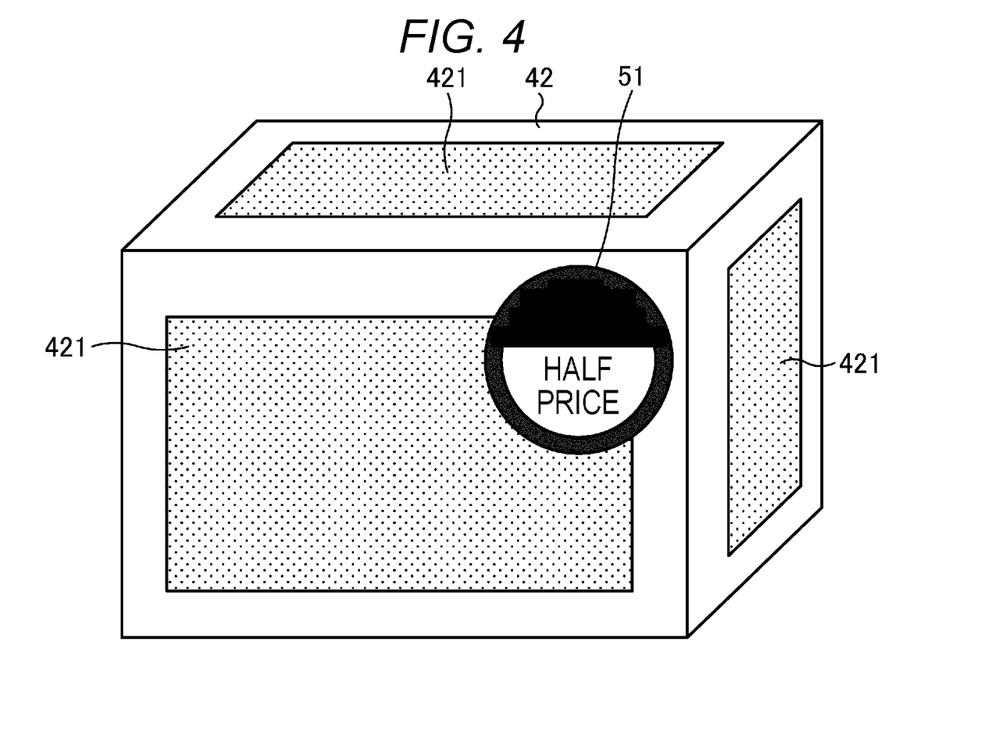
FIG. 4 is a perspective view illustrating an example of the appearance of a commodity on which a digitally watermarked code symbol is printed and a service label is attached.

Here, FIG. 3 is a perspective view illustrating an example of the appearance of a commodity 41 on which a code symbol 411, which is a visible image, is printed and a service label 51 is attached. Further, FIG. 4 is a perspective view illustrating an example of the appearance of a commodity 42 on which a digitally watermarked code symbol 421 is printed and the service label 51 is attached. The digitally watermarked code symbol 421 is an example of a code symbol that is an invisible image.

The commodities 41 and 42 are items such as food and clothing sold in stores, and are packaged in boxes or bag-shaped packages. As illustrated in FIGS. 3 and 4, the code symbols 411 and 421 such as barcodes and two-dimensional codes are attached to the packages of the commodities 41 and 42 by printing or the like. Information such as commodity codes for identifying the types of commodities 41 and 42 is stored in the code symbols 411 and 421 in a state of being encoded in a format compliant with standards such as Code 128.

In addition, the code symbol 421 is pre-printed on the package of a commodity as digital watermark information by digital watermarking technology such as Digimarc Barcode® (Digimarc Corp. of Beaverton, OR). The code symbol 421 is embedded as a pattern in the entire package of the commodity 42, for example, as illustrated in FIG. 4. As a result, the code symbol 421 can be read regardless of which part of the commodity 42 is imaged.

In the POS terminal 20, if the code symbols 411 and 421 are read by the reading device 10, sales data processing including registration processing and settlement processing of the commodities 41 and 42 is executed based on the commodity code stored in the code symbols 411 and 421.

In the present embodiment, the code symbol 421 is attached to the entire package of the commodity 42, but is not limited thereto, and may be attached to a part of the package like the code symbol 411 as the visible image illustrated in FIG. 3.

In addition, the service label 51 may be attached to the packages of commodities 41 and 42. The service label represents a service image in a visible state. The service image illustrates the service content provided to a shopper. The service includes, for example, discount, reduced price (sometimes referred to as discount), point addition, and the like.

The service image is represented by a predetermined figure or pattern. The service image may be considered to be easy to recognize. The service label 51 is individually attached to the commodity for which a service is provided. For example, the service label 51 is attached to a commodity or the like whose freshness date or expiration date is about to expire. If the service label 51 is read by the reading device 10, the POS terminal 20 executes processing of providing a service (discount, point addition, and the like) corresponding to the service label 51.

In the case of a commodity provided with the code symbol 411, which is a visible image as illustrated in FIG. 3, in the related art, by recognizing the service label 51 shortly after the recognition of the code symbol 411, processing of determining that the commodity is the target of a service is performed. Further, in the related art, in order to more reliably recognize the service label 51, a sticker (flag sticker) 52 displaying a simple figure (flag image) that can be recognized substantially at the same time as the code symbol 411 is attached near the code symbol 411. The flag sticker 52 indicates that the service label 51 is attached to the package of the commodity 41. Provided that the flag sticker 52 was read by the reading device 10, the service label 51 is attached to the package of the commodity 41 indicated by the code symbol 411 read together with the flag sticker 52, and the POS terminal 20 performs notification processing for prompting the operator to read the service label 51.

However, in the case of the commodity 42 provided with the digitally watermarked code symbol 421 as illustrated in FIG. 4, since the code symbol 421 cannot be visually recognized and the code symbol 421 is present anywhere on the package, it is impossible to process the commodity in the same manner as in the case of the code symbol 411, which is a visible image of the related art. Therefore, in the present embodiment, the position where the service label 51 is attached to the commodity 42 provided with the digitally watermarked code symbol 421 does not matter, and the processing for recognizing the service label 51 is performed on the premise thereof. This process will be described in detail later.

Returning to FIG. 2, the first display unit 13 is a display device for the operator. The first display unit 13 is provided above the imaging window 111. The first display unit 13 is a display device with a touch panel composed of a display device such as an LCD. The first display unit 13 displays the commodity name, price, and the like of the registered commodity to the operator in response to the registration processing by the POS terminal 20.

The keyboard 14 is provided in the vicinity (side portion) of the first display unit 13. The keyboard 14 has various keys and the like. FIG. 2 illustrates an example in which the first display unit 13 and the keyboard 14 are integrally provided, but the first display unit 13 and the keyboard 14 may be separated from each other.

The second display unit 15 is a display device with a touch panel composed of a display device such as an LCD. The second display unit 15 displays the commodity name, price, and the like of the registered commodity to a shopper in response to the sales registration processing by the POS terminal 20.

The configuration of the reading device 10 is not limited to the example of FIG. 2. For example, the reading device 10 may include a lighting device that illuminates the imaging area of the imaging unit 12 in the imaging window 111.

Figure 5:
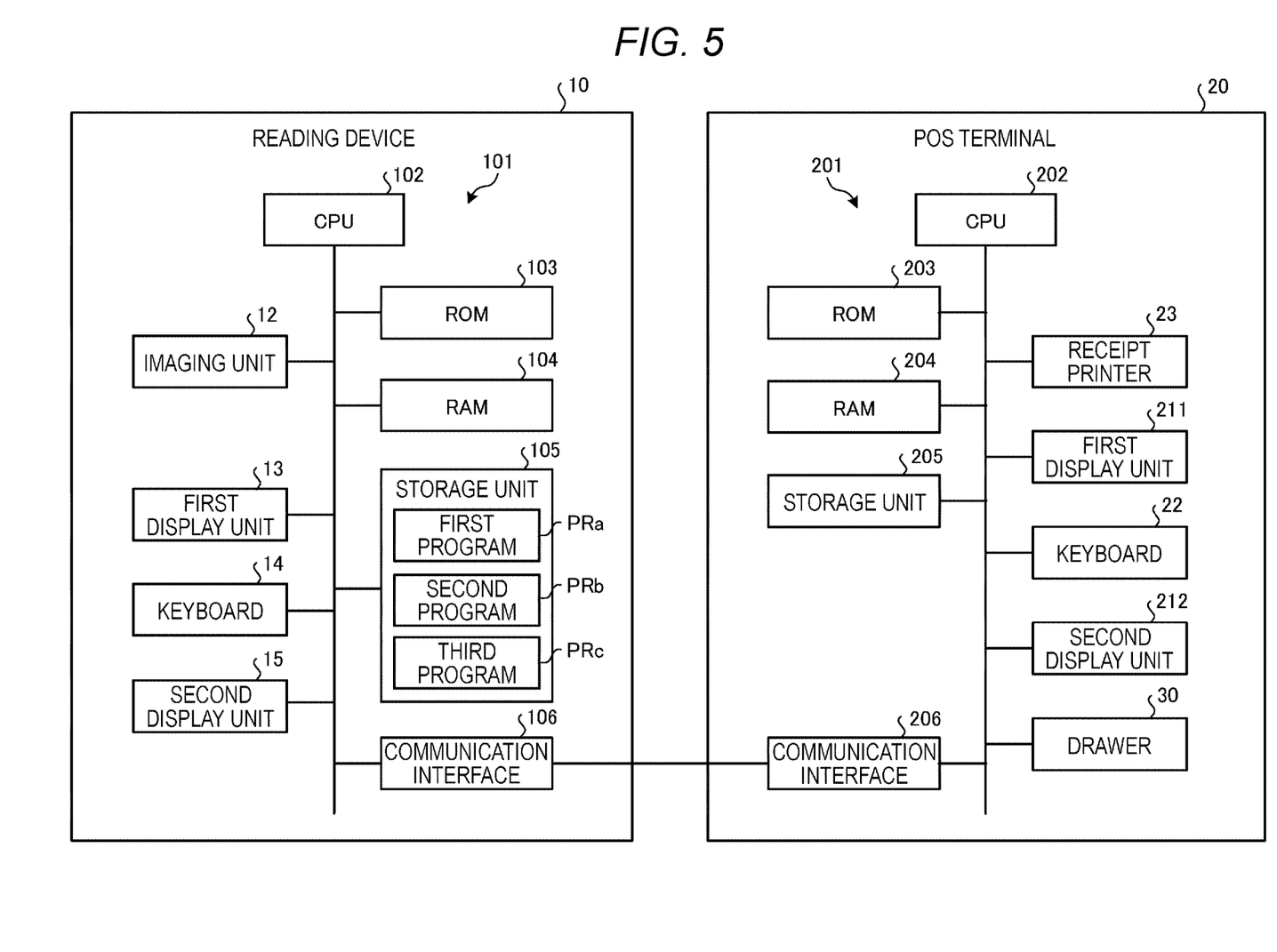
FIG. 5 is a block view illustrating an example of a hardware configuration of the reading device and a POS terminal.

FIG. 5 is a block view illustrating an example of the hardware configuration of the reading device 10 and the POS terminal 20.

The reading device 10 includes a microcomputer 101 as illustrated in FIG. 5, together with the imaging unit 12, the first display unit 13, the keyboard 14, and the second display unit 15 described above.

The microcomputer 101 includes, for example, a central processing unit (CPU) 102, a read only memory (ROM) 103, and a random access memory (RAM) 104. The CPU 102 is an example of a processor. The CPU 102 comprehensively controls each part of the reading device 10. The ROM 103 stores fixed information such as a control program in advance. The RAM 104 stores various data in a rewritable manner and functions as a work area or the like. Therefore, the microcomputer 101 constitutes an information processing unit that executes information processing. The RAM 104 may be entirely or partially composed of a non-volatile storage medium.

Further, the reading device 10 includes a storage unit or storage 105, a communication interface 106, and the like. Each component is connected to the microcomputer 101 (CPU 102) via a bus line or the like.

The imaging unit 12 outputs a captured image (image information) to the microcomputer 101. Further, the imaging unit 12 operates according to a control signal output from the microcomputer 101.

The first display unit 13 and the second display unit 15 operate according to the control signal output from the microcomputer 101, and display various images. Further, the first display unit 13 and the second display unit 15 output an operation signal corresponding to the touch operation received by the touch panel to the microcomputer 101. The operation signal received by the keyboard 14 is also output to the microcomputer 101.

The storage unit 105 is a storage device such as a hard disk drive (HDD) or solid state drive (SSD). The storage unit 105 stores various programs, various data, and the like related to the operation of the reading device 10. For example, the reading device 10 stores a control program for realizing each functional configuration (see FIG. 6) described later.

Further, the storage unit 105 stores a program for reading various information from the image of the commodity captured by the imaging unit 12. Specifically, the storage unit 105 stores a first program PRa for reading the code symbol which is a visible image attached to the package of a commodity. In addition, the storage unit 105 stores a second program PRb for reading the digitally watermarked code symbol attached to the package of a commodity. Further, the storage unit 105 stores a third program PRc for reading the service label attached to the package of a commodity (for recognizing a service image).

Each of the first program PRa, the second program PRb, and the third program PRc contains processing contents (functions and algorithms) according to the information to be read. For example, the first program PRa includes processing for detecting and decoding a code symbol which is a visible image, processing for recognizing a flag image attached to the package of a commodity, and the like. Further, the second program PRb includes processing for revealing a code symbol embedded as digital watermark information, processing for detecting a code symbol, processing for decoding a code symbol, and the like. The third program PRc includes processing related to recognition of a service image. A known technique can be used regardless of the reading method related to the reading of a code symbol and the reading of various figures (flag image, service image).

The communication interface 106 performs data communication with another device (POS terminal 20) via a connection line such as a LAN cable.

On the other hand, the POS terminal 20 includes a microcomputer 201 as illustrated in FIG. 5, together with the first display unit 211, the second display unit 212, the keyboard 22, the receipt printer 23, and the drawer 30 described above.

The microcomputer 201 includes, for example, a CPU 202, a ROM 203, and a RAM 204. The CPU 202 is an example of a processor. The CPU 202 comprehensively controls each part of the POS terminal 20. The ROM 203 stores fixed information such as a control program in advance. The RAM 204 stores various data in a rewritable manner and functions as a work area or the like. Therefore, the microcomputer 201 constitutes an information processing unit that executes information processing. The RAM 204 may be entirely or partially composed of a non-volatile storage medium.

Further, the POS terminal 20 includes a storage unit or storage 205, a communication interface 206, and the like. Each component is connected to the microcomputer 201 (CPU 202) via a bus line or the like.

The first display unit 211 and the second display unit 212 operate according to a control signal output from the microcomputer 201, and display various images. Further, the first display unit 211 and the second display unit 212 output an operation signal corresponding to the touch operation received by the touch panel to the microcomputer 201. The operation signal received by the keyboard 22 is also output to the microcomputer 201.

The storage unit 205 is a storage device such as an HDD or SSD. The storage unit 205 stores various programs, various data, and the like related to the operation of the POS terminal 20. For example, the storage unit 205 stores a program for processing sales data. The storage unit 205 stores a PLU file.

The PLU file is a data file in which the commodity code of a commodity and information (hereafter, also referred to as commodity information) such as the commodity name, type, and price of the commodity corresponding to the commodity code are associated for each of the commodities sold in the store. The POS terminal 20 reads the commodity information of the commodity corresponding to the commodity code read by the reading device 10 from the PLU file and temporarily stores the commodity information in the RAM 204 or the like to execute commodity registration processing. The PLU file may be stored in an external device that can be referenced from the POS terminal 20 instead of the storage unit 205.

The communication interface 206 performs data communication with another device (reading device 10) via a connection line such as a LAN cable.

Figure 6:
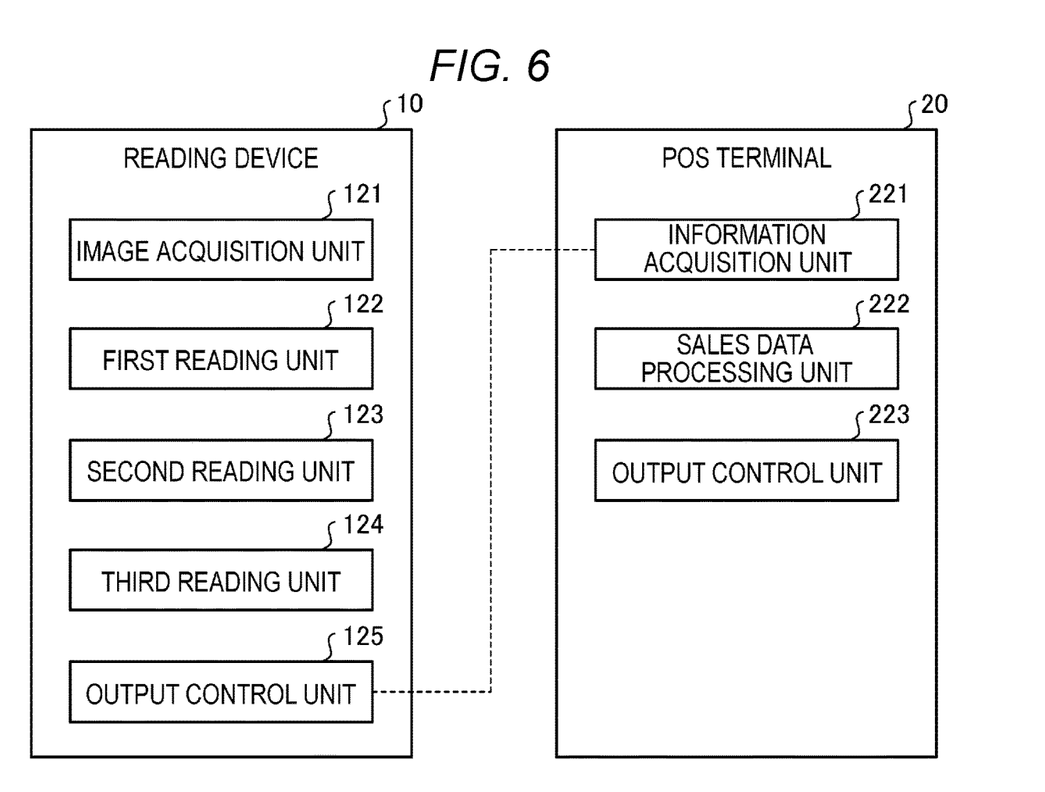
FIG. 6 is a block view illustrating an example of a functional configuration of the reading device and the POS terminal.

Next, the functional configurations of the reading device 10 and the POS terminal 20 will be described with reference to FIG. 6. FIG. 6 is a block view illustrating an example of the functional configuration of the reading device 10 and the POS terminal 20.

As illustrated in FIG. 6, the reading device 10 includes an image acquisition unit 121, which may be implemented as a scanner, a first reading unit or first reader 122, a second reading unit or second reader 123, a third reading unit or third reader 124, and an output control unit or output controller 125 as a functional configuration.

A part or all of the functional configuration of the reading device 10 may be realized as a software configuration by the cooperation of the CPU 102 and various programs stored in the storage unit 105. Further, a part or all of the functional configuration of the reading device 10 may be realized by a hardware configuration such as the CPU 102 or a dedicated circuit.

The image acquisition unit 121 acquires the image information output by the imaging unit 12. Specifically, if the image acquisition unit 121 is instructed to start a transaction by the operation via the keyboard 14 or the first display unit 13 or the signal notified from the POS terminal 20, the image acquisition unit 121 instructs the imaging unit 12 to perform imaging, and starts acquiring the image information output from the imaging unit 12.

Further, if the image acquisition unit 121 is instructed to end the transaction by the operation of the keyboard 14 or the first display unit 13 or the signal notified from the POS terminal 20, the image acquisition unit 121 instructs the imaging unit 12 to stop imaging, and stops the acquisition of image information output from the imaging unit 12.

The first reading unit 122, the second reading unit 123, and the third reading unit 124 read the information attached to the package of a commodity from the image of the commodity acquired by the image acquisition unit 121.

Specifically, the first reading unit 122 reads a code symbol and a flag image which are visible images included in the image information acquired by the image acquisition unit 121 by using the first program PRa stored in the storage unit 105. Further, the second reading unit 123 reads the digitally watermarked code symbol included in the image information acquired by the image acquisition unit 121 by using the second program PRb stored in the storage unit 105. Then, the third reading unit 124 recognizes the service image included in the image information acquired by the image acquisition unit 121 by using the third program PRc stored in the storage unit 105, and recognizes that the commodity to which the service image is attached is the target of a service.

If the first reading unit 122, the second reading unit 123, and the third reading unit 124 read information such as a commodity code from the image of the commodity acquired by the image acquisition unit 121, the read information is stored in RAM 104 or the like as registration information related to a commodity. Such registration information includes at least a commodity code, and if a service label is read, the registration information includes the service content corresponding to the service label.

The output control unit 125 outputs the information such as a commodity code read from the image of a commodity by the first reading unit 122, the second reading unit 123, and the third reading unit 124 to the POS terminal 20. Specifically, if the first reading unit 122, the second reading unit 123, and the third reading unit 124 read the registration information from the image of a commodity, the output control unit 125 outputs the read registration information to the POS terminal 20.

Further, the output control unit 125 causes the first display unit 13 and the second display unit 15 to display a display screen based on the registration information. Specifically, the output control unit 125 causes the first display unit 13 and the second display unit 15 to display the commodity name, price, and the like of the commodity corresponding to the commodity code included in the registration information based on the PLU file stored in the storage unit 205 of the POS terminal 20. If the registration information includes a service content, the output control unit 125 causes the first display unit 13 and the second display unit 15 to display the service content, the price after the service is applied, and the like.

On the other hand, as illustrated in FIG. 6, the POS terminal 20 includes an information acquisition unit or information receiver 221, a sales data processing unit or sales data processor 222, and an output control unit or output controller 223 as a functional configuration.

A part or all of the functional configurations of the POS terminal 20 may be realized as a software configuration by the cooperation of the CPU 202 and various programs stored in the storage unit 205. Further, a part or all of the functional configuration of the POS terminal 20 may be realized by a hardware configuration such as the CPU 202 or a dedicated circuit.

The information acquisition unit 221 acquires information from the reading device 10. Specifically, the information acquisition unit 221 acquires the registration information read by the reading device 10.

The sales data processing unit 222 executes sales data processing related to one transaction based on the registration information acquired by the information acquisition unit 221. That is, the sales data processing unit 222 is an example of the registration processing unit or registrar, and registers the information on the commodity identified by the code symbol read by the first reading unit 122 or the second reading unit 123 as sales data. Further, the sales data processing unit 222 is an example of the service processing unit or service processor, and if the third reading unit 124 recognizes a service image, the service indicated by the service image is reflected in the sales data.

Specifically, the sales data processing unit 222 executes registration processing of the commodity corresponding to the commodity code included in the registration information based on the PLU file stored in the storage unit 205. When receiving an operation for instructing the end of registration for one transaction via the keyboard 22 or the like, the sales data processing unit 222 executes settlement processing for settling the total price of the commodities based on the price and the like of each commodity registered up to that point.

If the registration information includes a service content, the sales data processing unit 222 applies the service content to the corresponding commodity and performs the registration processing. For example, if the service content indicates a discount or reduced price, the sales data processing unit 222 executes the registration processing with the subtracted price obtained by subtracting the amount specified by the service content from the price of the corresponding commodity.

Here, the sales data processing unit 222 functions as an example of a standby processing unit or standby processor. That is, if the commodity 42 is identified by the code symbol 421 (digital watermark) read by the second reading unit 123, the sales data processing unit 222 outputs a control signal to the reading device 10 to suspend reading by the second reading unit 123, and waits for the third reading unit 124 to read the service label 51, that is, to recognize a service image. In this case, reading by the first reading unit 122 may be suspended together with the second reading unit 123. In this way, the reading device 10 can be put into a state of reading only the service label 51.

Further, if the elapsed time from the suspension of the reading by the second reading unit 123 exceeds a predetermined threshold value, the sales data processing unit 222, as a standby processing unit or standby processor, ends the waiting for recognition of a service image by the third reading unit 124 and restarts the reading by the second reading unit 123.

The output control unit 223 controls the output of the processing result and state of the sales data processing performed by the sales data processing unit 222. Specifically, the output control unit 223 causes the display unit 21 (211 and 212) to display information on the commodity registered by the sales data processing unit 222. Further, the output control unit 223 causes the display unit (211 and 212) to display the breakdown and total amount of the commodities registered in one transaction, the information on the payment amount paid by a shopper, and the like. Further, if the sales data processing for one transaction is completed, the output control unit 223 outputs information such as the breakdown and total amount of the commodities registered in the transaction, and payment amount from the receipt printer 23 as a receipt.

Figure 7:
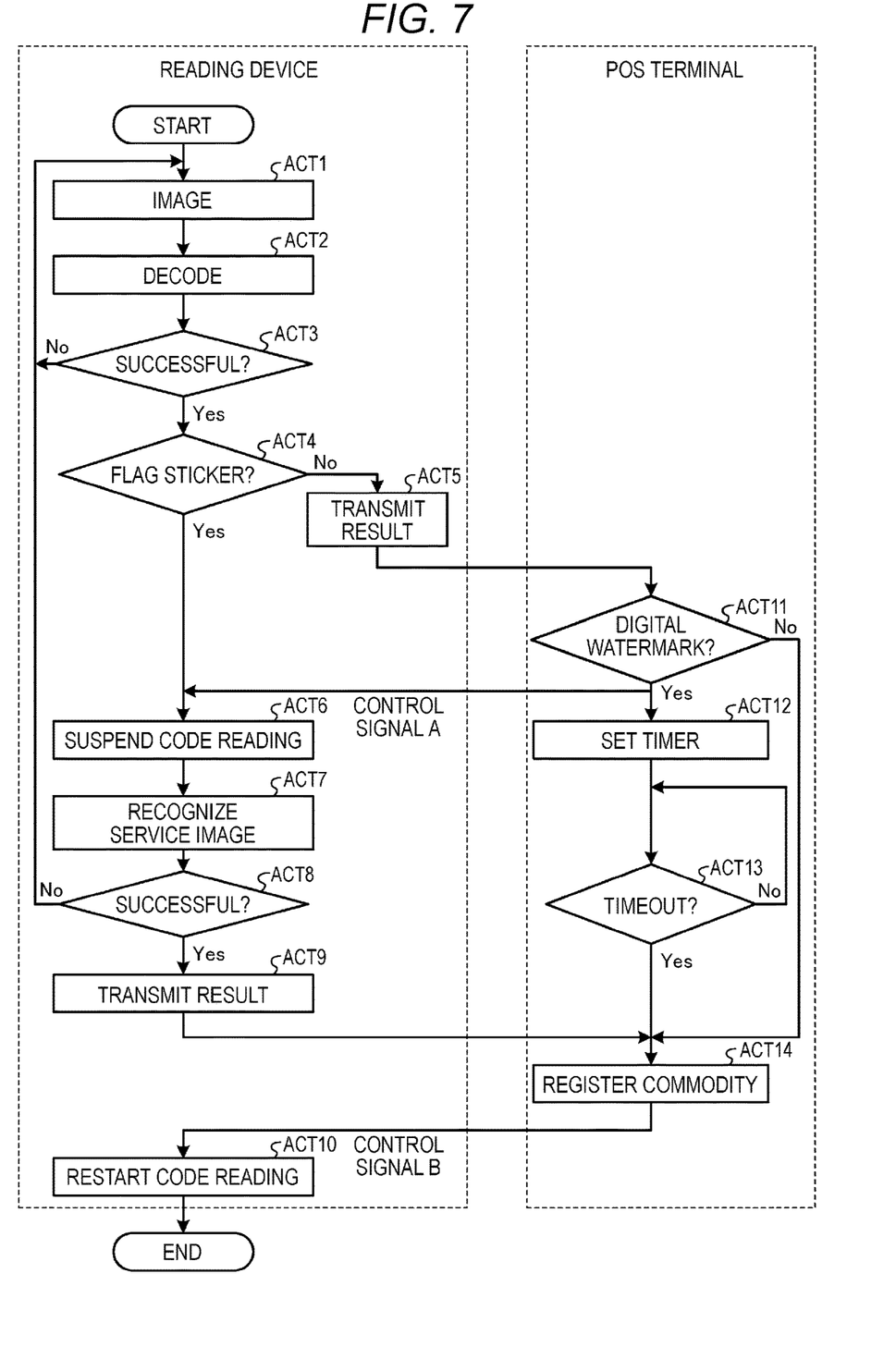
FIG. 7 is a flowchart illustrating an example of a flow of processing executed by the reading device and the POS terminal.

Hereinafter, the operation of the above-mentioned reading device 10 will be described. FIG. 7 is a flowchart illustrating an example of the flow of processing executed by the reading device 10 and the POS terminal 20.

First, the microcomputer 101 of the reading device 10 controls the imaging unit 12 as the image acquisition unit 121, and sequentially acquires the image information obtained by capturing the images of the commodities 41 and (ACT 1). Next, the microcomputer 101 decodes the code symbols 411 and 421 included in the image information acquired by the image acquisition unit 121 as the first reading unit 122 and the second reading unit 123 (ACT 2).

Next, the microcomputer 101 determines whether or not the decoding of the code symbols 411 and 421 is successful (ACT 3). If successful (Yes in ACT 3), the microcomputer 101 determines the presence or absence of the flag sticker 52 as the first reading unit 122 (ACT 4).

If the flag sticker 52 is not attached in ACT 4 (No in ACT 4), the microcomputer 101 transmits the decoding result of ACT 2 to the POS terminal 20 as the output control unit 125 (ACT 5).

If the flag sticker 52 is attached in ACT 4 (Yes in ACT 4), the microcomputer 101 suspends the reading of the code symbols 411 and 412 by the first reading unit 122 and the second reading unit 123 (ACT 6). In ACT 6, the microcomputer 101 guides the operator to hold the service label 51 attached to the commodities 41 and 42 over the imaging window 111 by displaying an image or wording on the first display unit 13, for example. Subsequently, the microcomputer 101 reads the service label 51, that is, recognizes a service image as the third reading unit 124 (ACT 7).

Next, the microcomputer 101 determines whether or not the recognition of the service image is successful (ACT 8). If successful (Yes in ACT 8), the microcomputer 101 transmits the decoding result of ACT 2 and the recognition result of ACT 7 to the POS terminal 20 as the output control unit 125 (ACT 9).

In the case of unsuccessful ACT 3 (No in ACT 3) and unsuccessful ACT 8 (No in ACT 8), the microcomputer 101 returns the processing to ACT 1.

The microcomputer 201 of the POS terminal 20 receives the reading result from the reading device 10 as the information acquisition unit 221. Here, the reading result is information for identifying whether the code symbol 411 or the code symbol 421 is used before decoding. For example, the information as the reading result contains different code types for the code symbol 411 and the code symbol 421. In this case, the microcomputer 201 identifies whether the code symbol is the code symbol 411 or the code symbol 421 before decoding, depending on which code type it is.

The microcomputer 201 of the POS terminal 20 determines whether or not the received reading result is the decoded digitally watermarked code symbol 421 (ACT 11). In ACT 11, if the reading result includes the code type of the code symbol 421 (Yes in ACT 11), as the sales data processing unit 222, the microcomputer 201 transmits a predetermined control signal A to the reading device 10, sets a timer (ACT 12), and waits until a timeout (No in ACT 13). It is preferable that the length of time tracked in ACT 12 to ACT 13 (threshold value for timeout) is sufficient for executing ACT 6 to ACT 9 in the reading device 10, and the waiting time when the service label 51 is not attached is not too long. Then, with the timeout (Yes in ACT 13), the microcomputer 201 performs commodity registration (ACT 14), and transmits a control signal B instructing the reading device 10 to restart code reading (ACT 10).

If the reading result includes the code type of the code symbol 411 in ACT 11 (No in ACT 11), the microcomputer 201 advances the processing to ACT 14 as the sales data processing unit 222.

Upon receiving the control signal A, the microcomputer 101 of the reading device 10 performs the processing of ACT 6 to ACT 9, and transmits the recognition result of ACT 7 to the POS terminal 20. The microcomputer 201 of the POS terminal 20 that has received the information transmitted by the reading device 10 in ACT 9 performs commodity registration based on the received information in ACT 14.

Hereinafter, the registration processing performed in ACT 14 will be described in more detail with a specific example.

First, the case of the commodity 41 on which the code symbol 411 as a visible image is printed and the service label 51 and the flag sticker 52 are attached will be described. The microcomputer 101 proceeds with the processing of imaging (ACT 1) and decoding of the code symbol 411 (ACT 2). If the microcomputer 101 succeeds in decoding (Yes in ACT 3) and recognizes the flag sticker 52 (Yes in ACT 4), the microcomputer 101 suspends reading the code symbols 411 and 421 (ACT 6) and reads the service label (ACT 7). If the microcomputer 101 succeeds in recognizing a service image (Yes in ACT 8), the microcomputer 101 transmits the information on the code symbol 411 decoded in ACT 2 and the content indicated by the service image to the POS terminal 20 as a reading result (ACT 9). The microcomputer 201 of the POS terminal 20 registers a commodity based on the reading result transmitted in ACT 9 (ACT 14), and transmits the control signal B to the reading device 10. Then, the microcomputer 101 of the reading device 10 that has received the control signal B restarts reading the code symbols 411 and 421 suspended in ACT 6 (ACT 10).

Next, the case of the commodity 42 to which the digitally watermarked code symbol 421 is printed and the service label 51 is attached will be described. The microcomputer 101 proceeds with the processing of imaging (ACT 1) and decoding of the code symbol 421 (ACT 2). If the decoding is successful (Yes in ACT 3), the microcomputer 101 transmits the information of the code symbol 421 decoded in ACT 2 to the POS terminal 20 as a reading result (ACT 5) after the flag sticker is not detected (No in ACT 4). The microcomputer 201 of the POS terminal 20 proceeds with the processing from Yes in ACT 11 to ACT 12 and ACT 13, and waits for recognition of a service image. During this time, the microcomputer 101 of the reading device 10 performs the processing of ACT 6 to ACT 9 by receiving the control signal A, and transmits the content indicated by the service image to the POS terminal 20 as a reading result (ACT 9). The microcomputer 201 of the POS terminal 20 registers a commodity (ACT 14) based on the reading result transmitted in ACT 9 and the information of the code symbol 421 transmitted in ACT 5 and received in ACT 11, and transmits the control signal B to the reading device 10. Then, the microcomputer 101 of the reading device 10 that has received the control signal B restarts reading the code symbols 411 and 421 suspended in ACT 6 (ACT 10).

Next, a case of a commodity on which the service label 51 and the flag sticker 52 are not attached and the code symbol 411 as a visible image is printed (not illustrated) will be described. The microcomputer 101 proceeds with the processing of imaging (ACT 1) and decoding of the code symbol 411 (ACT 2), and if the decoding is successful (Yes in ACT 3), the microcomputer 101 transmits the information of the code symbol 411 decoded in ACT 2 to the POS terminal 20 as a reading result (ACT 5) after the flag sticker is not detected (No in ACT 4). The microcomputer 201 of the POS terminal 20 proceeds with the processing in ACT 14 through No in ACT 11, and registers a commodity based on the information of the code symbol 411 transmitted in ACT 5 and received in ACT 11 (ACT 14), and transmits the control signal B to the reading device 10. Then, since the microcomputer 101 of the reading device 10 that has received the control signal B does not suspend the reading of the code symbols 411 and 421 in this case, the reading of the code symbols 411 and 421 is continued in ACT 10.

Next, a case of a commodity on which the service label 51 is not attached and the digitally watermarked code symbol 421 is printed (not illustrated) will be described. The microcomputer 101 proceeds with the processing of imaging (ACT 1) and decoding of the code symbol 421 (ACT 2), and if the decoding is successful (Yes in ACT 3), the microcomputer 101 transmits the information of the code symbol 421 decoded in ACT 2 to the POS terminal 20 as a reading result (ACT 5) after the flag sticker is not detected (No in ACT 4). The microcomputer 201 of the POS terminal 20 proceeds with the processing from Yes in ACT 11 to ACT 12 and ACT 13, and waits for recognition of a service image. During this time, the microcomputer 101 of the reading device 10 performs the processing of ACT 6 to ACT 9 by receiving the control signal A, but a service image is not recognized. Therefore, the microcomputer 201 of the POS terminal 20 proceeds with the processing of ACT 14 due to the timeout (No in ACT 13). The microcomputer 201 of the POS terminal 20 registers a commodity based on the information of the code symbol 421 transmitted in ACT 5 and received in ACT 11 (ACT 14), and transmits the control signal B to the reading device 10. Upon receiving the control signal B, the microcomputer 101 of the reading device 10 restarts reading the code symbols 411 and 421 suspended in ACT 6 (ACT 10).

As described above, according to the present embodiment, in the sales data processing system 1 that not only identifies the commodity 41 by the code symbol 411 as a visible image but also identifies the commodity 42 by the code symbol 421 printed by a digital watermark, a service if the service label 51 is attached to the commodity 42 can be automatically reflected as in the case of the commodity 41.

The above-described embodiment can be appropriately modified and implemented by changing a part of the configuration or function of the reading device or reader 10. Therefore, in the following, a modification example according to the above-described embodiment will be described as another embodiment. Further, in the modification example, the points different from the above-described embodiment will be mainly described, and the detailed description of the points common to the contents already described will be omitted. The modification example may be implemented individually or may be implemented in combination as appropriate.

Modification Example 1

In the present modification example, if the commodity 42 is identified by the code symbol 421 read by the second reading unit 123, if an instruction of service application is received by the interface unit or interface (sticker reading button displayed on the first display unit 13 or the first display unit 211 or keyboard 14 and 22), the sales data processing unit 222, as a standby processing unit or standby processor, suspends reading by the second reading unit 123 and waits for recognition of a service image by the third reading unit 124.

Further, in this modification example, if the code symbols 411 and 421 are read by the first reading unit 122 or the second reading unit 123 before the interface unit or interface receives an instruction, the sales data processing unit 222, as a standby processing unit or standby processor, ends the reception of an instruction by the interface unit or interface.

Figure 8:
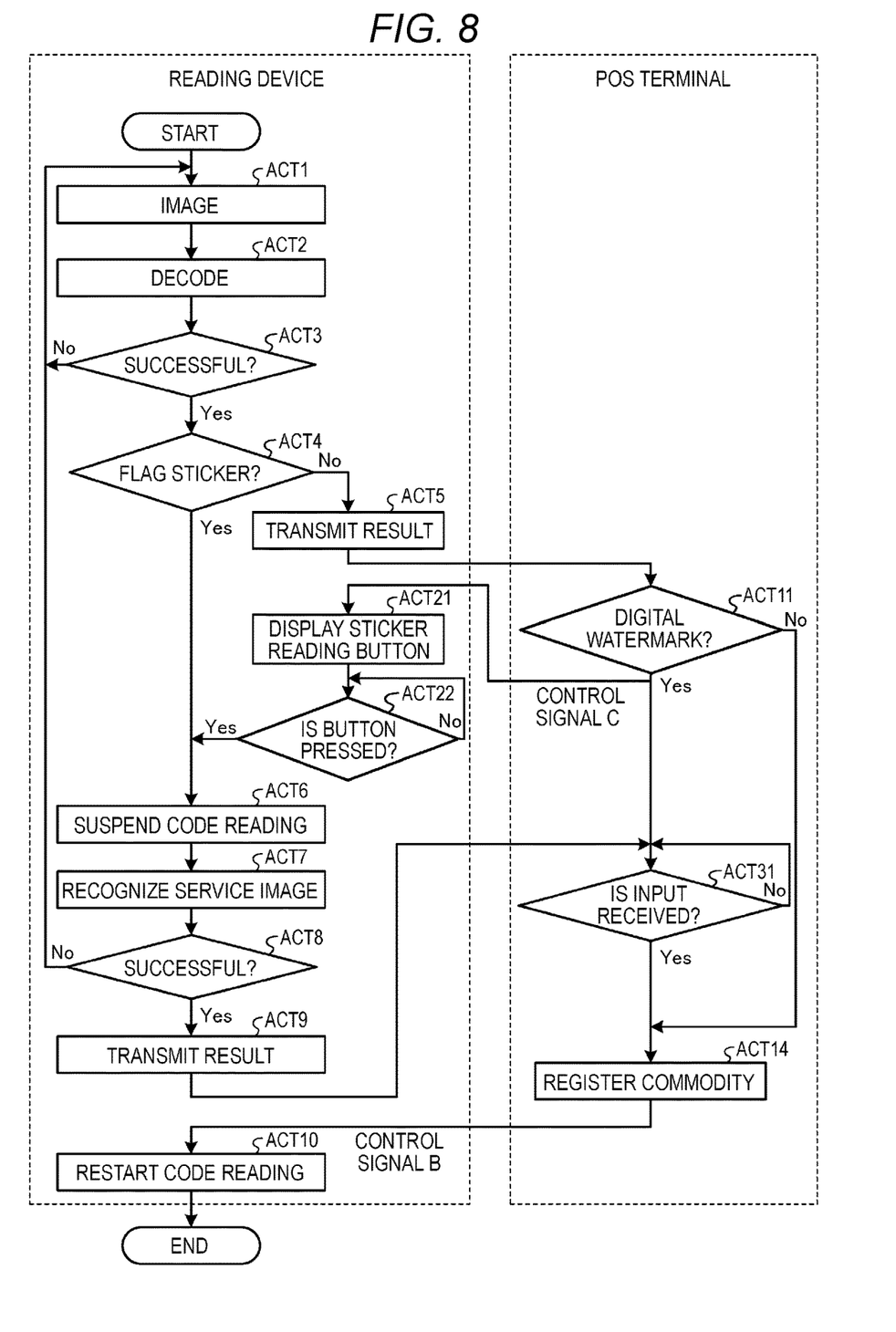
FIG. 8 is a flowchart illustrating an example of a flow of processing executed by the reading device and the POS terminal.

FIG. 8 is a flowchart illustrating an example of the flow of processing executed by the reading device 10 and the POS terminal 20. In this example, instead of ACT 12 to ACT 13 in the above-described embodiment, the reading device 10 performs the processing of ACT 21 and ACT 22, and the POS terminal 20 performs the processing of ACT 31.

In ACT 11, the microcomputer 201 of the POS terminal 20 outputs a control signal C to the reading device 10 if the code symbol is the digitally watermarked code symbol 421 (Yes in ACT 11).

Upon receiving the control signal C, the microcomputer 101 of the reading device 10 causes the first display unit 13 to display the sticker reading button (ACT 21). The sticker reading button is displayed, for example, in the corner of the commodity registration screen that displays a list of registered commodity information. In the reading device 10, the processing of ACT 1 to ACT 5 can be executed even while the sticker reading button is not operated (No in ACT 22).

If the sticker reading button is pressed on the reading device 10 (Yes in ACT 22), the first display unit outputs a signal indicating that the sticker reading button has been operated to the microcomputer 101. Upon receiving this signal, the microcomputer 101 performs the processing of ACT 6 to ACT 9 and outputs the recognition result of the service image to the POS terminal 20 (ACT 9).

On the other hand, if the code symbol is the digitally watermarked code symbol 421 in ACT 11 (Yes in ACT 11), the microcomputer 201 of the POS terminal 20 waits for the input of a predetermined signal (No in ACT 31). If a predetermined signal is input during this standby (Yes in ACT 31), the microcomputer 201 advances the processing to ACT 14.

The predetermined signal described above is, for example, the result transmitted after a service image is recognized (ACT 9), the result transmitted after the code symbols 411 and 421 of the next commodity are read (ACT 5), or a signal output by the keyboard 22 after the subtotal button is operated.

If the input detected in ACT 31 is the result transmitted after a service image is recognized (ACT 9), the microcomputer 201 of the POS terminal 20 registers a commodity (ACT 14) based on the reading result transmitted in ACT 9 and the information of the code symbol 421 transmitted in ACT 5 and received in ACT 11 and transmits the control signal B to the reading device 10.

As described above, according to the present modification example, if the service label 51 is attached to the commodity 42 with the digitally watermarked code symbol 421, the operator can indicate his or her intention to perform reading of the service label 51. With this method, it is possible to insert processing of recognizing a service image without using a timeout.

In the above modification example, the sticker reading button is displayed on the first display unit 13 of the reading device 10, but in practice, the sticker reading button may be displayed on the first display unit 211 of the POS terminal 20. Further, the function of the sticker reading button may be assigned to the hard keys of the keyboards 14 and 22.

Modification Example 2

In the above-described embodiment and modification example, the reading device 10 is configured to read information such as a commodity code from the image captured by the imaging unit 12, but the present disclosure is not limited thereto, and the POS terminal 20 may be configured to read information. In that case, the reading device 10 outputs the image captured by the imaging unit 12 to the POS terminal 20, and the POS terminal 20 reads information such as a commodity code from the image input from the reading device 10. Specifically, the microcomputer 201 of the POS terminal 20 may have the functions as the first reading unit 122 to the third reading unit 124 described with reference to FIG. 6.

Modification Example 3

In the above-described embodiment and modification examples, the reading device 10 and the POS terminal 20 are separately configured, but the present disclosure is not limited thereto, and a device (hereinafter, referred to as commodity sales data processing device or a commodity sales data processor), in which the reading device or reader 10 and the POS terminal 20 are integrated may be applied. For example, the commodity sales data processing device may be a full self-service commodity sales data processing device operated by a shopper himself or herself.

Modification Example 4

In the above-described embodiment and modification examples, a code type is used to determine whether a read code symbol is a digital watermark or a visible image, but the present disclosure is not limited thereto when implementing, and for example, it may be determined which code symbol the read code symbol is based on the type of program used to read a code symbol.

As described above, the program executed by each device described in each of the above-described embodiment and modification examples is provided by being incorporated into a storage medium in advance, but is not limited thereto, and the program may be configured to be recorded and provided in a computer-readable recording medium such as a CD-ROM, a flexible disk (FD), a CD-R, a digital versatile disk (DVD) or the like in a file in an installable format or an executable format.

The storage medium is not limited to a medium independent of a computer or an embedded system, but includes a storage medium in which a program transmitted by a LAN, the Internet, or the like is downloaded and stored or temporarily stored.

Further, the program executed by the reading device of the above embodiment may be stored on a computer connected to a network such as the Internet and provided by being downloaded via the network. Further, the program executed by the reading device 10 of the above embodiment may be provided or distributed via a network such as the Internet.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A sales data processing system comprising:
    an imaging unit configured to generate and output image information by imaging;
    a first reader configured to read a code symbol, which is a visible image, included in the image information;
    a second reader configured to read a code symbol, which is an invisible image, included in the image information;
    a third reader configured to recognize a service indicated by a service image by recognizing the service image included in the image information;
    a registrar configured to register information as sales data on a first commodity identified by the code symbol read by the first reader or the second reader;
    a standby processor configured to suspend reading by the second reader and wait for recognition of the service image by the third reader in response to the second reader identifying the first commodity by the code symbol read by the second reader; and
    a service processor configured to reflect the service indicated by the service image in the sales data registered by the registrar in response to the third reader recognizing the service image.

2. The system according to claim 1,
    wherein in response to an elapsed time from the suspension of the reading by the second reader exceeding a predetermined threshold value, the standby processor ends the waiting for the recognition of the service image by the third reader and the second reader restarts the reading.

3. The system according to claim 1, further comprising:
an interface configured to display information to an operator and receive an input to execute operations, and
wherein in response to the second reader identifying the first commodity by the code symbol read by the second reader and based on a first instruction of service application, the first instruction received by the interface, the standby processor suspends the reading by the second reader and waits for the recognition of the service image by the third reader.

4. The system according to claim 3, in response to at least one of (i) a code symbol identifying a second commodity being read by the first reader or the second reader prior to receiving the first instruction by the interface in response to a user selection, (ii) a result of the recognition of the service image by the third reader being transmitted to another system, or (iii) a second instruction received by the interface in response to a user selection, the standby processor prevents the reception of the first instruction by the interface.

5. The system according to claim 1, wherein
the standby processor is configured to suspend the reading by the second reader and the reading by the first reader.

6. A method for causing a computer included in a sales data processing system to carry out operations comprising:
reading, by a first reader, a code symbol, which is a visible image, included in the image information;
reading, by a second reader, a code symbol, which is an invisible image, included in the image information;
recognizing, by a third reader, a service indicated by a service image by recognizing the service image included in the image information;
registering, by a registrar, information as sales data on a first commodity identified by the code symbol read by the first reader or the second reader;
suspending, by a standby processor, reading by the second reader and waiting for recognition of the service image by the third reader in response to the second reader identifying the first commodity by the code symbol read by the second reader; and
reflecting, by a service processor, the service indicated by the service image in the sales data registered by the registrar in response to the third reader recognizing the service image.

7. The method of claim 6, further comprising:
ending the waiting, by the standby processor, for the recognition of the service image by the third reader and restarting the reading by the second reader in response to an elapsed time from the suspension of the reading by the second reader exceeding a predetermined threshold value.

8. The method of claim 6, further comprising:
displaying, on an interface, information to an operator and receiving an input to execute operations, and
suspending, by the standby processor, the reading by the second reader and the waiting for the recognition of the service image by the third reader in response to the first commodity being identified by the code symbol read by the second reader and based on a first instruction of service application being received by the interface.

9. The method of claim 8, further comprising:
preventing, by the standby processor, the reception of the first instruction by the interface in response to at least one of (i) a code symbol identifying a second commodity being read by the first reader or the second reader prior to receiving the first instruction by the interface in response to a user selection, (ii) a result of the recognition of the service image by the third reader being transmitted to another system, or (iii) a second instruction received by the interface in response to a user selection.

10. The method of claim 6, further comprising:
suspending the reading by the second reader and the reading by the first reader.

11. A non-transitory computer readable medium configured to store instructions which, when executed by a processor, cause the processor to carry out operations comprising:
reading, by a first reader, a code symbol, which is a visible image, included in image information;
reading, by a second reader, a code symbol, which is an invisible image, included in the image information;
recognizing, by a third reader, a service indicated by a service image by recognizing the service image included in the image information;
registering, by a registrar, information as sales data on a first commodity identified by the code symbol read by the first reader or the second reader;
suspending, by a standby processor, reading by the second reader and waiting for recognition of the service image by the third reader in response to the second reader identifying the first commodity by the code symbol read by the second reader; and
reflecting, by a service processor, the service indicated by the service image in the sales data registered by the registrar in response to the third reader recognizing the service image.

12. The non-transitory computer readable medium of claim 11, wherein the operations further comprise:
ending the waiting, by the standby processor, for the recognition of the service image by the third reader and restarting the reading by the second reader in response to an elapsed time from the suspension of the reading by the second reader exceeding a predetermined threshold value.

13. The non-transitory computer readable medium of claim 11, wherein the operations further comprise:
displaying, on an interface, information to an operator and receiving an input to execute operations, and
suspending, by the standby processor, the reading by the second reader and the waiting for the recognition of the service image by the third reader in response to the first commodity being identified by the code symbol read by the second reader and based on a first instruction of service application being received by the interface.

14. The non-transitory computer readable medium of claim 13, wherein the operations further comprise:
preventing, by the standby processor, the reception of the first instruction by the interface in response to at least one of (i) a code symbol identifying a second commodity being read by the first reader or the second reader prior to receiving the first instruction by the interface in response to a user selection, (ii) a result of the recognition of the service image by the third reader being transmitted to another non-transitory computer readable medium, or (iii) a second instruction received by the interface in response to a user selection.

15. The non-transitory computer readable medium of claim 11, wherein the operations further comprise:
suspending the reading by the second reader and the reading by the first reader.

* * * * *